(12) United States Patent
Koza et al.

(10) Patent No.: US 11,915,378 B2
(45) Date of Patent: Feb. 27, 2024

(54) METHOD AND SYSTEM FOR PROPOSING AND VISUALIZING DENTAL TREATMENTS

(71) Applicants: DENTSPLY SIRONA INC., York, PA (US); SIRONA DENTAL SYSTEMS GMBH, Bensheim (DE)

(72) Inventors: André Koza, Worms (DE); Ronny Kucharczyk, Worms (DE)

(73) Assignee: DENTSPLY SIRONA INC., York, PA (US)

( * ) Notice: Subject to any disclaimer, the term of this patent is extended or adjusted under 35 U.S.C. 154(b) by 201 days.

(21) Appl. No.: 17/310,278

(22) PCT Filed: Jan. 22, 2020

(86) PCT No.: PCT/EP2020/051468
§ 371 (c)(1),
(2) Date: Jul. 27, 2021

(87) PCT Pub. No.: WO2020/156896
PCT Pub. Date: Aug. 6, 2020

(65) Prior Publication Data
US 2022/0139044 A1 May 5, 2022

(30) Foreign Application Priority Data
Jan. 30, 2019 (EP) .................................... 19000053

(51) Int. Cl.
*G06T 19/00* (2011.01)
*A61C 7/00* (2006.01)
(Continued)

(52) U.S. Cl.
CPC ............ *G06T 19/006* (2013.01); *A61C 7/002* (2013.01); *A61C 9/004* (2013.01); *G06T 7/0012* (2013.01);
(Continued)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 10,467,815 B2 * 11/2019 Marom ............... G02B 27/0093
2017/0065379 A1 * 3/2017 Cowburn ........... A61C 13/0004
(Continued)

FOREIGN PATENT DOCUMENTS

EP 3689287 A1 * 8/2020 ........... A61B 5/0088
WO WO-2020232223 A1 * 11/2020 ............. A61C 7/002

*Primary Examiner* — Todd Buttram
(74) *Attorney, Agent, or Firm* — DENTSPLY SIRONA INC.

(57) ABSTRACT

A method, system and computer readable storage media for proposing and visualizing orthodontic treatments. A patient may use a mobile device such as a smart phone to quickly and inexpensively visualize an orthodontic treatment for misaligned teeth and overlay it on a 3D model of the face and jaw, with a depth sensor being used to detect depth information. The orthodontic treatment may also be visualized in an augmented manner for a clinician. 3D data of the orthodontic treatment may be used for further analysis or fabrication of a treatment appliance.

13 Claims, 5 Drawing Sheets

(51) Int. Cl.
 *A61C 9/00* (2006.01)
 *G06T 7/11* (2017.01)
 *G06T 7/70* (2017.01)
 *G06T 7/00* (2017.01)
 *G06T 7/20* (2017.01)

(52) U.S. Cl.
 CPC ................ *G06T 7/11* (2017.01); *G06T 7/20* (2013.01); *G06T 7/70* (2017.01); *G06T 2200/04* (2013.01); *G06T 2207/30036* (2013.01); *G06T 2207/30201* (2013.01)

(58) Field of Classification Search
 CPC .... G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
 See application file for complete search history.

(56) References Cited

U.S. PATENT DOCUMENTS

| | | | |
|---|---|---|---|
| 2020/0020170 A1* | 1/2020 | Marom | A61B 90/36 |
| 2020/0306010 A1* | 10/2020 | Aamodt | G16H 30/40 |
| 2022/0139044 A1* | 5/2022 | Koza | G06T 19/006 |
| | | | 345/419 |

\* cited by examiner

METHOD AND SYSTEM FOR PROPOSING AND VISUALIZING DENTAL TREATMENTS

CROSS-REFERENCE TO RELATED APPLICATIONS

This is a National Phase application of International Application No. PCT/EP20201051468, filed Jan. 22, 2020, which claims the benefit of and priority to EP Application Ser. No. 19000053.9, filed on Jan. 30, 2019, which are herein incorporated by reference for all purposes.

FIELD OF THE INVENTION

The present application generally relates to a method, a system and a computer readable storage media for orthodontic analysis and, more particularly, to a method, system and computer readable storage media for detecting a misalignment of teeth and proposing and visualizing possible orthodontic/dental treatments, in real time, utilizing augmented reality.

BACKGROUND OF THE INVENTION

Dentists may usually detect a misalignment of teeth of a patient in a standard investigation/clinical check. Patients may then be transferred to an orthodontist for further treatment. In some cases, diagnosis of the condition of the teeth may take place late, for example, if the patient does not go to the dentist on a regular base. Moreover, manual diagnosis by an orthodontist may be time consuming. There may therefore be a need to quickly and/or inexpensively diagnose a misalignment of teeth, propose possible solutions and visualize the proposal.

U.S. Patent Application Publication No. US20180249912A1 discloses a preview of how the teeth may look using an image of the teeth that was obtained beforehand.

U.S. Pat. No. 9,675,305B2 discloses the use of photos to detect wrong positions of teeth without depth information.

US Patent Application No. 2017202633 discloses an imaging and display system for guiding medical interventions comprising a wearable display for viewing by a user wherein the display presents a composite, or combined image that includes pre-operative surgical navigation images, intraoperative images, and in-vivo microscopy images or sensing data. A probe, such as a microscopy probe or a sensing probe, may be used to acquire in-vivo imaging/sensing data from the patient and the intraoperative and in-vivo images may be acquired using tracking and registration techniques to align them with the pre-operative image and the patient to form a composite image for display.

US Patent Application No. 20020082498 discloses a method for image-guided surgery comprising capturing 3-dimensional (3D) volume data of a portion of a patient, processing the volume data so as to provide a graphical representation of the data, capturing a stereoscopic video view of a scene including a portion of said patient, rendering the graphical representation and the stereoscopic video view in a blended manner so as to provide a stereoscopic augmented image, and displaying said stereoscopic augmented image in a video-see-through display.

US Patent Application Publication No. 20160191887 describes a real-time surgery navigation method and apparatus for displaying an augmented view of a patient from a static or dynamic viewpoint of a surgeon. A surface image, a graphical representation of the internal anatomic structure of the patient processed from preoperative or intraoperative images, and a computer geometrically registering both images may be used. Responsive to geometrically registering the images, a head mounted display may present to a surgeon an augmented view of the patient.

SUMMARY OF THE INVENTION

Existing limitations associated with the foregoing, as well as other limitations, can be overcome by the method according to claim 1, the system according to claim 10, and the computer readable storage media according to claim 12 each for proposing and visualizing an orthodontic treatment.

Orthodontic treatments may hereinafter be used interchangeably with cosmetic treatments to cover various treatments of the tooth such as correction of malocclusions (including for example overjets, overbites, crossbites, etc.), as well as improving the smile of a patient including the use of dental crowns, dental veneers, dental bonding, inlays, onlays, implants and the like.

In an aspect herein, the present invention provides a method for the visualization of an orthodontic/cosmetic treatments, the method comprising: recording a three-dimensional image of a face to obtain a three-dimensional facial data record; determining characteristic points within the three-dimensional facial data record; segmenting a mouth area based on the characteristic points; obtaining a three-dimensional representation of actual teeth to be corrected; determining an orthodontic treatment as a three-dimensional tooth data record based on the obtained three-dimensional representation of actual teeth; and overlaying the orthodontic treatment on a mouth area of the three-dimensional facial data record.

In another aspect herein, the method further comprises one or more of the following steps: (i) determining characteristic points within the three-dimensional facial data record, determining a direction of orientation of the face in the three-dimensional facial data record based on the characteristic points; and orienting said orthodontic treatment such that its direction matches the direction of orientation of the face in the three-dimensional facial data record, (ii) recording said three-dimensional image of the face with a mobile device, (iii) designing a corrective appliance based on the orthodontic treatment, (iv) wherein the three-dimensional representation of actual teeth is obtained through extraction from the three-dimensional image of the face or obtained from a scan, (v) establishing reference objects/reference frames and/or detecting anatomical dental features in the three-dimensional representation of actual teeth to be corrected; and determining misalignments of the three-dimensional representation of actual teeth to be corrected by comparing the reference objects/reference frames and/or anatomical dental features with reference data, (vi) wherein the reference data includes data obtained from ongoing patient treatments, past patient treatments, scientific literature and textbooks, (vii) wherein the anatomical features include at least one of cusps, ridges, grooves and contact points, (viii) continuously updating a three-dimensional facial data record based on data from a tracking system including real time data tracking changes in facial expressions and/or patient movements, (ix) wherein the orthodontic treatment is obtained in real-time.

In yet another aspect herein, the present invention provides a method for the augmented visualization of an orthodontic treatment, the method comprising: recording a three-dimensional image of a face to obtain a three-dimensional facial data record; segmenting a mouth area based on the characteristic points; obtaining a three-dimensional representation of actual teeth to be corrected; determining an orthodontic treatment as a three-dimensional tooth data record based on the obtained three-dimensional representation of actual teeth; overlaying the orthodontic treatment as an augmentation on a treatment site through a display device for augmented visualization such that the orthodontic treatment appears directly superimposed on said treatment site.

In another aspect herein, the method further comprises one or more of the following steps: (i) wherein the display device for augmented visualization is an augmented reality glass or HUD display, (ii) further comprising designing a corrective appliance based on the orthodontic treatment, (iii) wherein the three-dimensional representation of actual teeth is obtained through extraction from the three-dimensional image of the face or obtained from a scan, (iv) further comprising: establishing reference objects/reference frames and/or detecting anatomical dental features in the three-dimensional representation of actual teeth to be corrected; and determining misalignments of the three-dimensional representation of actual teeth to be corrected by comparing the reference objects/reference frames and/or anatomical dental features with reference data, (v) wherein the reference data includes data obtained ongoing patient treatments, past patient treatments, scientific literature and textbooks, (vi) wherein the anatomical features include at least one of cusps, ridges, grooves and contact points, (vii) further comprising continuously updating the three-dimensional facial data record based on data from a tracking system including real time data tracking changes in facial expressions, clinician movements and/or patient movements, (viii) wherein the orthodontic treatment is obtained in real-time.

In another aspect herein, the present invention provides a system for visualizing an orthodontic treatment, the system comprising: a mobile device having a means for distance measurement, a means for motion tracking and/or a means for color measurement, and at least one processor configured to perform the steps of: recording a three-dimensional image of a face to obtain a three-dimensional facial data record; segmenting a mouth area based on the characteristic points; obtaining a three-dimensional representation of actual teeth to be corrected; determining an orthodontic treatment as a three-dimensional tooth data record based on the obtained three-dimensional representation of actual teeth; and overlaying the orthodontic treatment on a mouth area of the three-dimensional facial data record.

The system may further comprise one or more of the following configurations: (i) wherein the processor is further configured to perform the steps of: determining a direction of orientation of the face in the three-dimensional facial data record based on the characteristic points; and orienting said orthodontic treatment such that its direction matches the direction of orientation of the face in the three-dimensional facial data record, (ii) wherein the processor is further configured to perform the step of designing a corrective appliance based on the orthodontic treatment, (iii) wherein the three-dimensional representation of actual teeth is obtained through extraction from the three-dimensional image of the face or obtained from a scan (iv) wherein the processor is further configured to perform the steps of: establishing reference objects/reference frames and/or detecting anatomical dental features in the three-dimensional representation of actual teeth to be corrected; and determining misalignments of the three-dimensional representation of actual teeth to be corrected by comparing the reference objects/reference frames and/or anatomical dental features with reference data, (v) wherein the reference data includes data obtained from ongoing patient treatments, past patient treatments, scientific literature and textbooks, (vi) wherein the processor is further configured to perform the step of continuously updating the three-dimensional facial data record based on data from a tracking system including real time data tracking changes in facial expressions and/or patient movements.

In another aspect herein, the present invention may provide a system for visualizing an orthodontic treatment, the system comprising: a display device for augmented visualization, and at least one processor configured to perform the steps of; recording a three-dimensional image of a face to obtain a three-dimensional facial data record; determining characteristic points within the three-dimensional facial data record; segmenting a mouth area based on the characteristic points; obtaining a three-dimensional representation of actual teeth to be corrected; determining an orthodontic treatment as a three-dimensional tooth data record based on the obtained a three-dimensional representation of actual teeth; overlaying the orthodontic treatment as an augmentation on a treatment site through the display device for augmented visualization such that the orthodontic treatment appears directly superimposed on said treatment site.

The system may further comprise one or more of the following configurations: (i) wherein the display device for augmented visualization is an augmented reality glass or HUD (head-up display) display, (ii) wherein the processor is further configured to perform the steps of designing a corrective appliance based on the orthodontic treatment, (iii) wherein the three-dimensional representation of actual teeth is obtained through extraction from the three-dimensional image of the face or obtained from an intraoral scan, (iv) wherein the processor is further configured to perform the steps of: establishing reference objects/reference frames and/or detecting anatomical dental features in the three-dimensional representation of actual teeth to be corrected; and determining misalignments of the three-dimensional representation of actual teeth to be corrected by comparing the reference objects/reference frames and/or anatomical dental features with reference data, (v) wherein the reference data includes data obtained ongoing patient treatments, past patient treatments, scientific literature and textbooks, (vi) wherein the processor is further configured to perform the steps of continuously updating the three-dimensional facial data record based on data from a tracking system including real time data tracking changes in facial expressions, clinician movements and/or patient movements.

In another aspect herein, the present invention may provide a non-transitory computer-readable storage medium storing a program which, when executed by a computer system, causes the computer system to perform a procedure comprising: recording a three-dimensional image of a face to obtain a three-dimensional facial data record; determining characteristic points within the three-dimensional facial data record; segmenting a mouth area based on the characteristic points; obtaining a three-dimensional representation of actual teeth to be corrected; determining an orthodontic treatment as a three-dimensional tooth data record based on the obtained three-dimensional representation of actual teeth; and overlaying the orthodontic treatment on a mouth area of the three-dimensional facial data record.

BRIEF DESCRIPTION OF THE DRAWINGS

Example embodiments will become more fully understood from the detailed description given herein below and the accompanying drawings, wherein.

DETAILED DESCRIPTION OF THE INVENTION

In accordance with example aspects described herein, a method, system and computer readable storage media may be provided for detecting a misalignment of teeth and proposing possible orthodontic/cosmetic treatments.

System for Proposing and Visualizing an Orthodontic/Cosmetic Treatment

Figure 1:
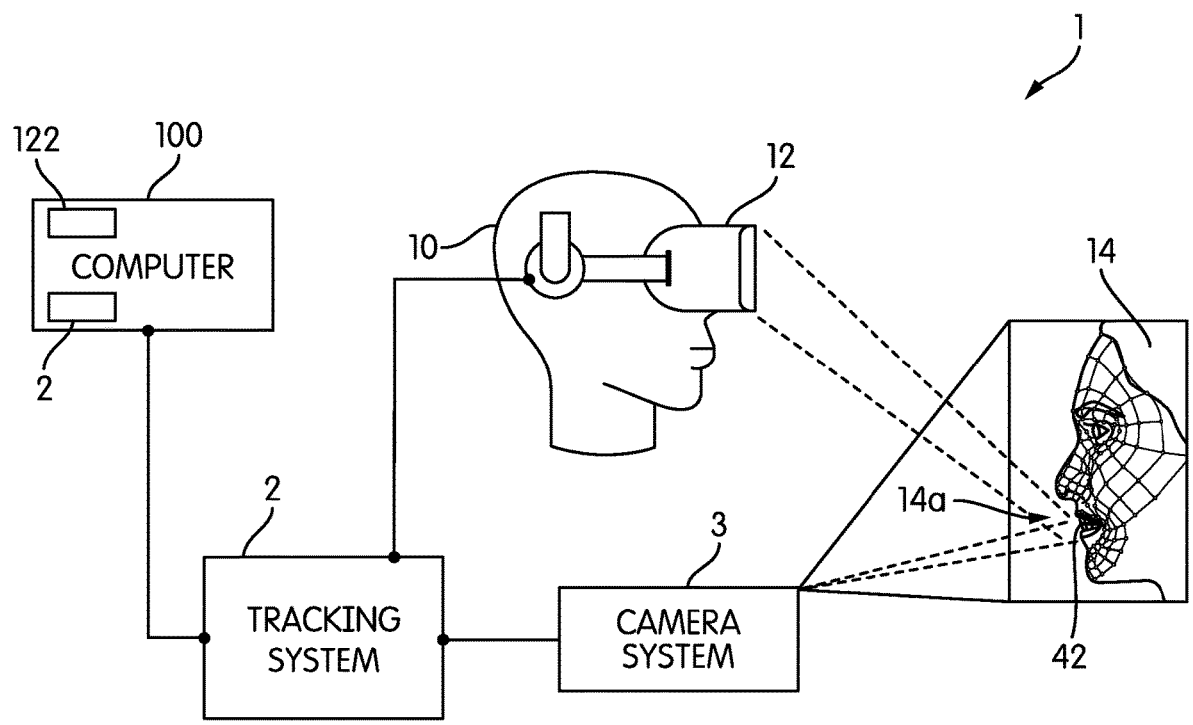
FIG. 1 is a block diagram illustrating an orthodontic/cosmetic visualization system according to an embodiment of the present invention.
Figure 2:
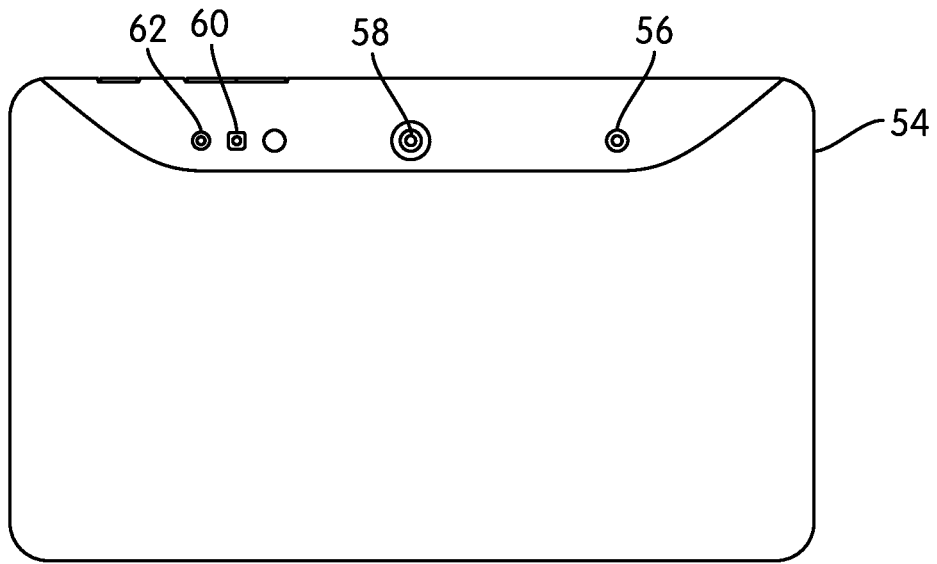
FIG. 2 illustrates a mobile device according to an exemplary embodiment of the present invention.

FIG. 1 illustrates a visualization system 1 comprising a display device 12 for augmented visualization such as head mounted augmented reality glasses, an HUD display, or a stereoscopic display capable of receiving stereoscopic video images, or otherwise display device 12 that may be used for overlaying an orthodontic treatment 42 in an augmented manner on a target/treatment site 14a or on a stereoscopic video of the target/treatment site 14a such that the orthodontic treatment 42 appears to be superimposed on the target/treatment site 14a when viewed by a clinician 10. The visualization system 1 may also include a camera system 3, wherein the camera system 3 may preferably be a mobile device 54 such as a smart phone (as shown in FIG. 2) equipped with a color, depth and motion tracking sensors. In particular, the mobile device 54 may have an RGB-IR camera 62 for color measurement, an IR projector 56, for distance measurement using infra-red rays, and a fisheye camera 58 for motion tracking. Herein, an orthodontic proposal/treatment may be displayed virtually on the display of the mobile device 54, and preferably over a real-time 3D model of a patient's face for viewing. The mobile device 54 may also have a flash 60 for lighting an object during of the real-time 3D model. Of course, the mobile device 54 may also have other means for color measurement, distance measurement and motion tracking of a patient 14 as may be appreciated by a person of ordinary skill in the art. Herein, a patient 14 may use a display of the mobile device 54 to view an orthodontic treatment 42 overlaid on a video or 3D model of him/herself. In an alternative embodiment herein, the camera system 3 may be a 3D optical tracking system and/or stereoscopic camera system and may be included in the computer system and/or may form or be a part of the tracking system 2. The camera system 3 may also be embedded in the display device 12 of the clinician 10. The camera system may operate under one of several depth sensing principles including, for example, (i) structural light, (ii) Time of Flight (ToF) and/or (iii) stereoscopic principles explained hereinafter. For cameras employing structural light, a light source may be used to project a known pattern onto the patient 14, and a receiver may detect the distortion of the reflected pattern to calculate depth map based on geometry. For cameras employing Time of Flight (ToF) principles, a light source may send out a pulse, and a sensor may detect a reflection of the pulse from the patient 14 in order to record it's time of flight. Knowing that and the constant speed of light, the system may calculate how far away the patient 14 is. Alternatively, a modulated light source may be sent and a phase change of light reflected from the patient may be detected. For cameras employing stereoscopic principles, multiple cameras may be placed at different positions to capture multiple images of the patient, and a depth map may be calculated based on geometry. This depth information may be used to track the patient's location during treatment (e.g. during dental treatment).

Figure 3:
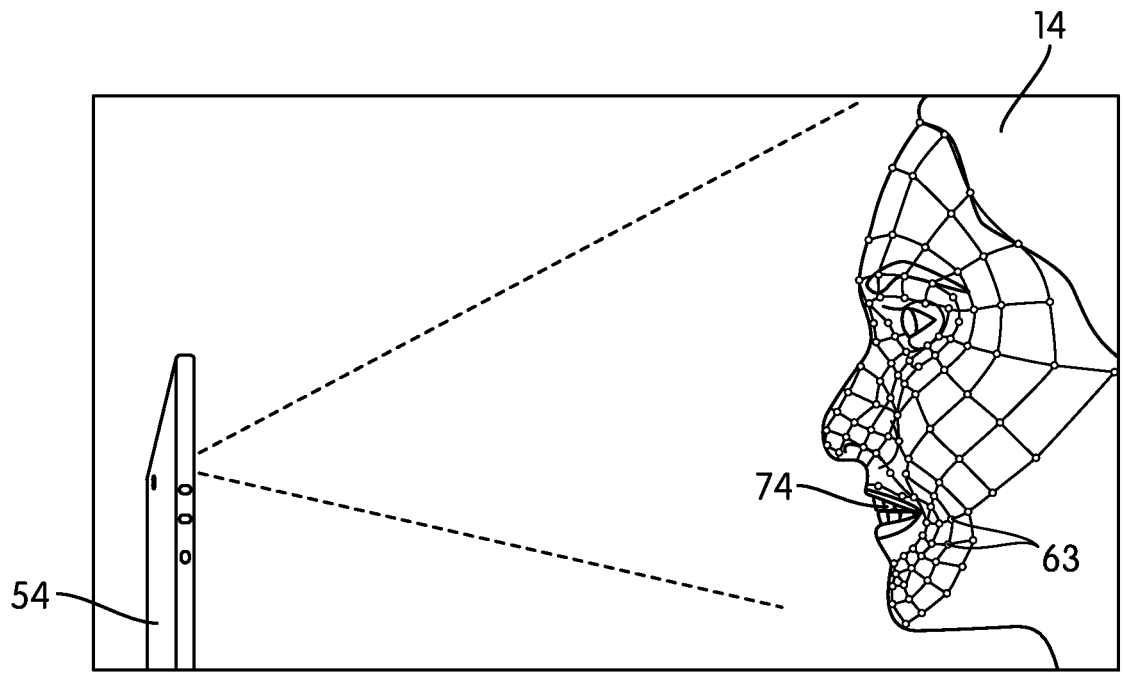
FIG. 3 illustrates a side view of a mobile device and a patient according to an exemplary embodiment of the present invention.

The target/treatment site 14a may be a buccal cavity area of the patient 14 corresponding to locations of the patient's actual teeth 74 (FIG. 3). Alternatively, the orthodontic treatment 42 may be overlaid on a plain background on the display of the mobile device 54 or may be displayed directly on a screen of a smart glass worn by the clinician 10 without being superimposed in an augmented manner. In order to obtain the orthodontic treatment 42 a patients' actual teeth 74 may be captured preferably three dimensionally and analyzed to determine any corrections needed as explained in the methods hereinafter.

The display device 12 of FIG. 1 may be connected to or form part of a computer system 100. The computer system 100 may include the tracking system 2 and a processor 122. The tracking system 2 may alternatively be separate from the computer system 100 and may form at least part of any of the other devices, components, and/or systems discussed herein. The tracking system 2 may be electrically connected to a processor 122 and may offer real-time location data for a precise location and orientation of images and objects in a common coordinate system. In an exemplary embodiment herein, the tracking system may be vision based, for example utilizing cameras of the camera system 3 for visual tracking of the face of the patient 14, or characteristic points 63 (FIG. 3) on the face of the patient 14 or predetermined markers (not shown) placed on the face of the patient, using for example object/pattern recognition.

The processor 122 may be configured to receive real time three dimensional patient facial data, to analyze said data to obtain an orthodontic treatment 42 and to overlay said orthodontic treatment 42 on (i) the treatment site 14a for viewing by the clinician 10 through the display 12 and/or (ii) on a region in a 3D model or stereoscopic video of the patient corresponding to the treatment site 14.

In so doing, the clinician 10 and/or patient 14 may receive real-time proposed orthodontic treatments that possess depth and that may move/shift accordingly with changing facial expressions or locations of the patient 14 as if they were real teeth. This may be achieved, for example, by monitoring the characteristic points 63 in real time and showing or hiding portions of the displayed orthodontic treatments based on changes in locations of the characteristic points 63 caused by the changing facial expressions. Example facial expressions may include (a) smiling wherein the processor 122 may be configured to show all teeth or most teeth, (b) opening the mouth wherein the processor 122 may be configured to show the upper jaw to not be in contact with the lower jaw, (c) closing the mouth wherein the processor 122 may be configured to show no teeth, (d) biting wherein the processor 122 may be configured to show the upper jaw in contact with the lower jaw) etc.

In an exemplary embodiment of the present invention, the orthodontic treatment 42 may optionally be overlaid on the treatment site 14*a* after a request is received from the clinician 10 through a user interface of the computer system 100 (such as a gesture recognition system and/or a voice recognition system or the like) before or during a treatment procedure.

Overlaying of the orthodontic treatment 42 on the treatment site 14*a* or 3D model or stereo video of the treatment site may be performed dynamically and in real time and may be achieved by the processor 122 working in tandem with the tracking system 2 wherein changes in position of (i) the patient 14 and/or (ii) the clinician 10, as well as changes in facial expressions of the patient 14, captured by the tracking system 2, may be translated into corresponding changes in positions of the overlaid orthodontic treatment 42 such that said orthodontic treatment 42 appears directly superimposed even as the patient 14 and/or or clinician 10 moves. Moreover, responsive to a rejection of the proposal, the processor 122 may be configured to provide the further proposals until one is accepted. An accepted proposal may be stored for fabrication of aligners or for use in other orthodontic/dental treatments.

Computer System for Proposing and Visualizing an Orthodontic/Cosmetic Treatment

Having described the system 1 of FIG. 1 reference will now be made to FIG. 4, which shows a block diagram of a computer system 100 that may be employed in accordance with at least some of the example embodiments herein. Although various embodiments may be described herein in terms of this exemplary computer system 100, after reading this description, it may become apparent to a person skilled in the relevant art(s) how to implement the disclosure using other computer systems and/or architectures.

In one example embodiment herein, the computer system 100 may include at least one computer processor 122 and may include a tracking system 2, user interface 126 and input unit 130. The input unit 130 in one exemplary embodiment may be used by the clinician 10 along with a display unit 128 such as a monitor to send instructions or requests about a treatment to the computer processor 122. In another exemplary embodiment herein, the input unit 130 is a finger or stylus to be used on a touchscreen interface (not shown). The input unit 130 may alternatively be a gesture/voice recognition device, a trackball, a mouse or other input device such as a keyboard or stylus. In one example, the display unit 128, the input unit 130, and the computer processor 122 may collectively form the user interface 126.

The computer processor 122 may include, for example, a central processing unit, a multiple processing unit, an application-specific integrated circuit ("ASIC"), a field programmable gate array ("FPGA"), or the like. The processor 122 may be connected to a communication infrastructure 124 (e.g., a communications bus, or a network). In an embodiment herein, the processor 122 may receive a request for automatically calculating and displaying an orthodontic treatment 42 and may obtain instructions concerning the request from one or more storage units of the computer system 100. The processor 122 may then load said instructions and execute the loaded instructions such as using a database or artificial intelligence (AI) to obtain possible treatments for display.

One or more steps/procedures for proposing the orthodontic treatment 42 may be stored on a non-transitory storage device in the form of computer-readable program instructions. To execute a procedure, the processor 122 loads the appropriate instructions, as stored on a storage device, into memory and then executes the loaded instructions.

The computer system 100 may further comprise a main memory 132, which may be a random access memory ("RAM") and also may include a secondary memory 134. The secondary memory 134 may include, for example, a hard disk drive 136 and/or a removable-storage drive 138 (e.g., a floppy disk drive, a magnetic tape drive, an optical disk drive, a flash memory drive, and the like). The removable-storage drive 138 may read from and/or write to a removable storage unit 140 in a well-known manner. The removable storage unit 140 may be, for example, a floppy disk, a magnetic tape, an optical disk, a flash memory device, and the like, which may be written to and read from by the removable-storage drive 138. The removable storage unit 140 may include a non-transitory computer-readable storage medium storing computer-executable software instructions and/or data.

In further alternative embodiments, the secondary memory 134 may include other computer-readable media storing computer-executable programs or other instructions to be loaded into the computer system 100. Such devices may include a removable storage unit 144 and an interface 142 (e.g., a program cartridge and a cartridge interface); a removable memory chip (e.g., an erasable programmable read-only memory ("EPROM") or a programmable read-only memory ("PROM")) and an associated memory socket; and other removable storage units 144 and interfaces 142 that allow software and data to be transferred from the removable storage unit 144 to other parts of the computer system 100.

The computer system 100 also may include a communications interface 146 that enables software and data to be transferred between the computer system 100 and external devices. Such an interface may include a modem, a network interface (e.g., an Ethernet card or a wireless interface), a communications port (e.g., a Universal Serial Bus ("USB") port or a FireWire® port), a Personal Computer Memory Card International Association ("PCMCIA") interface, Bluetooth®, and the like. Software and data transferred via the communications interface 146 may be in the form of signals, which may be electronic, electromagnetic, optical or another type of signal that may be capable of being transmitted and/or received by the communications interface 146. Signals may be provided to the communications interface 146 via a communications path 148 (e.g., a channel). The communications path 148 may carry signals and may be implemented using wire or cable, fiber optics, a telephone line, a cellular link, a radio-frequency ("RF") link, or the like. The communications interface 146 may be used to transfer software or data or other information between the computer system 100 and a remote server or cloud-based storage (not shown).

One or more computer programs or computer control logic may be stored in the main memory 132 and/or the secondary memory 134. The computer programs may also be received via the communications interface 146. The computer programs may include computer-executable instructions which, when executed by the computer processor 122, cause the computer system 100 to perform the methods as described hereinafter. In another embodiment, the software may be stored in a non-transitory computer-readable storage medium and loaded into the main memory 132 and/or the secondary memory 134 of the computer system 100 using the removable-storage drive 138, the hard disk drive 136, and/or the communications interface 146. Control logic (software), when executed by the processor 122, causes the computer system 100, and more generally the system for visualizing an orthodontic treatment 1, to perform all or some of the some of the methods described herein.

In another example embodiment, the computer system 100 may be a mobile device 54 having an application that may be engaged by a user to propose and visualize orthodontic treatments 42.

Implementation of other hardware arrangement so as to perform the functions described herein will be apparent to persons skilled in the relevant art(s) in view of this description.

Method for Proposing and Visualizing an Orthodontic/Cosmetic Treatment.

Figure 4:
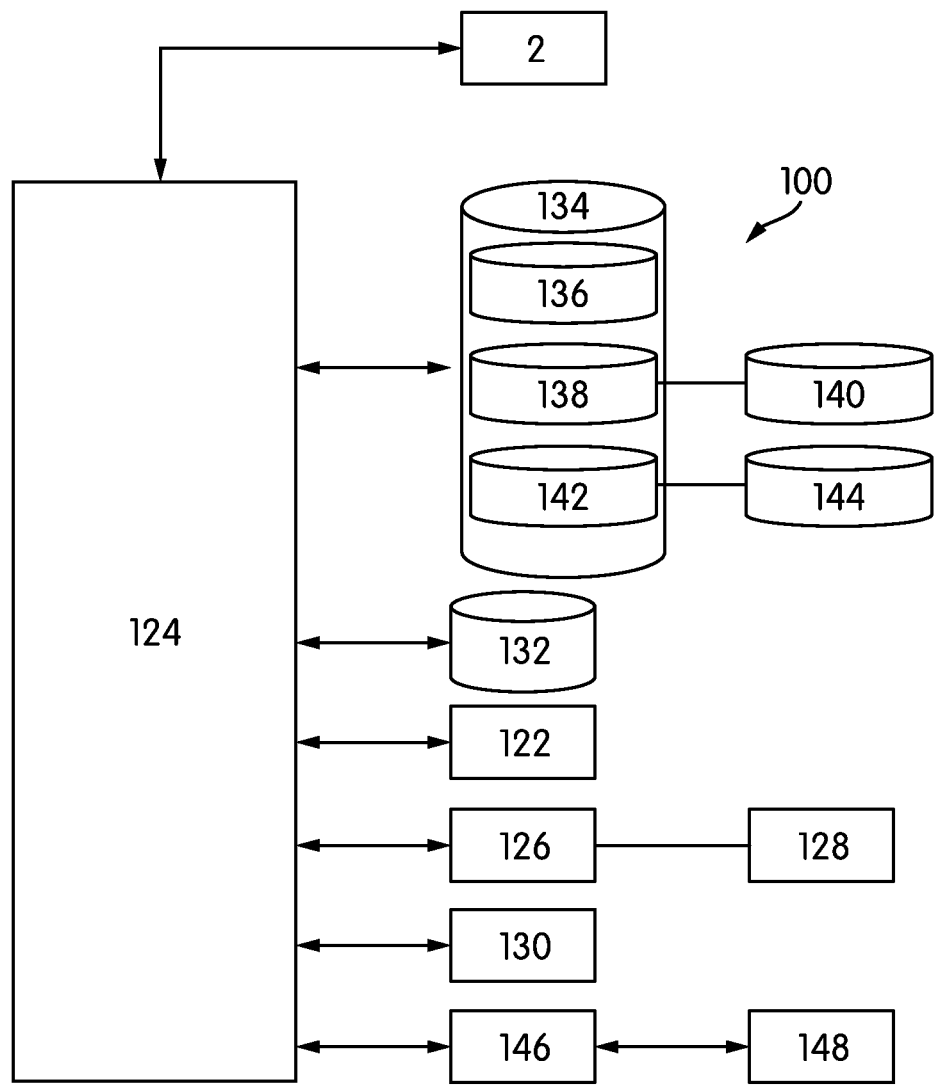
FIG. 4 is a block diagram showing a computer system according to an exemplary embodiment of the present invention.
Figure 5:
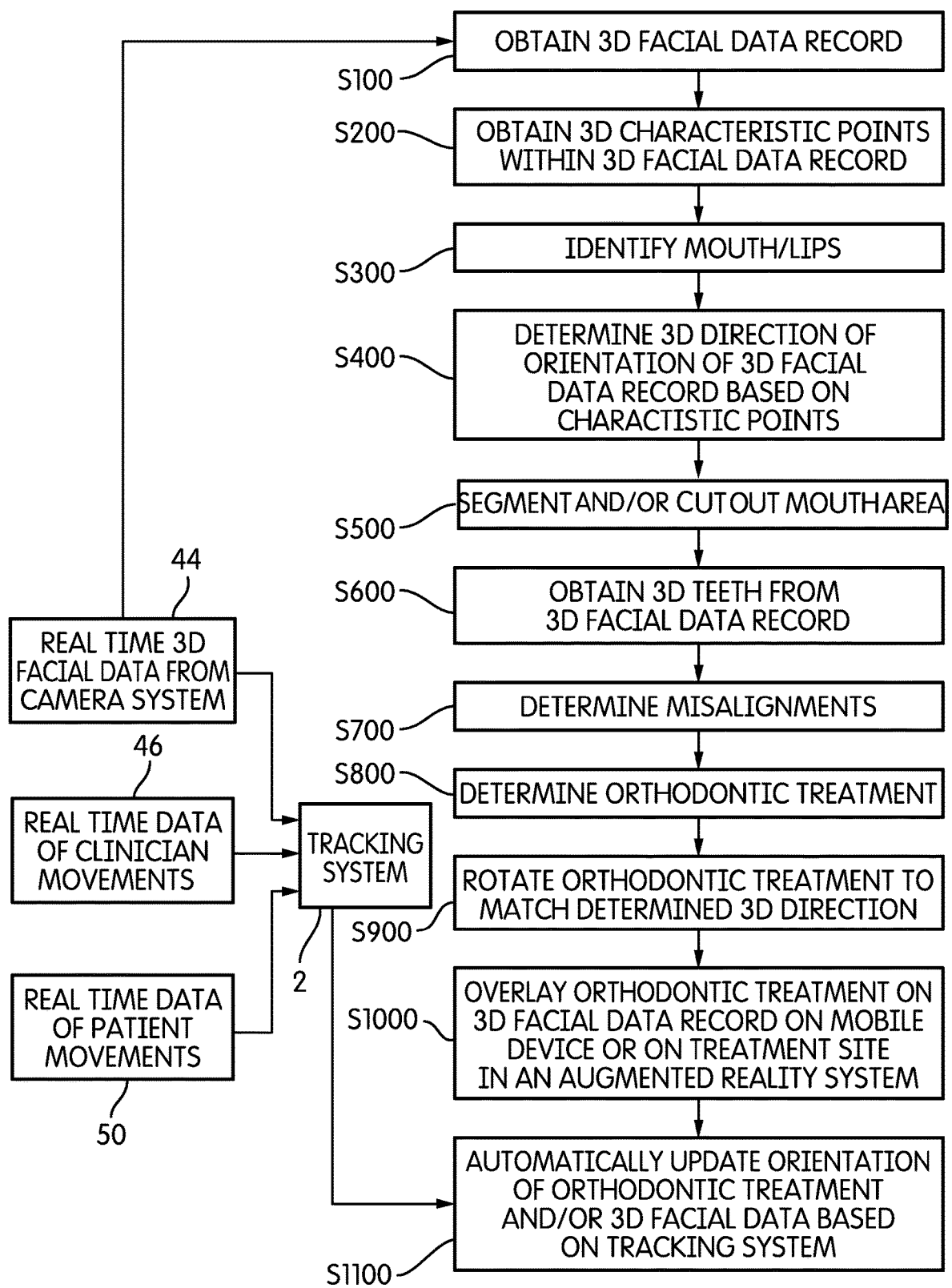
FIG. 5 is a flow chart showing a method according to an exemplary embodiment of the present invention.

Having described the computer system 100 of FIG. 4, methods for proposing and visualizing an orthodontic treatment will now be further described in conjunction with FIGS. 5-7.

Figure 6A:
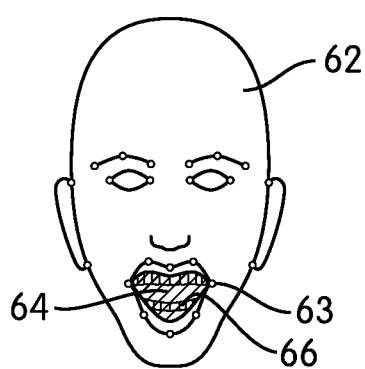
FIG. 6a is a front view of a three-dimensional data record of a patient's face.
Figure 6B:
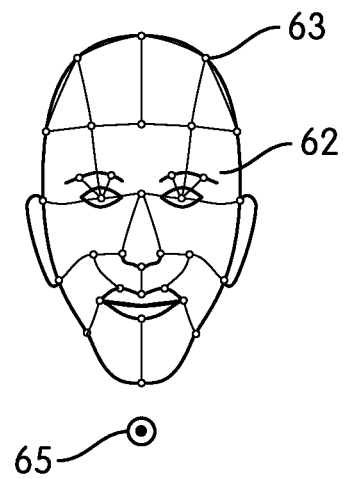
FIG. 6b is a front view of a three-dimensional data record of a patient's face having characteristic points.
Figure 7A:
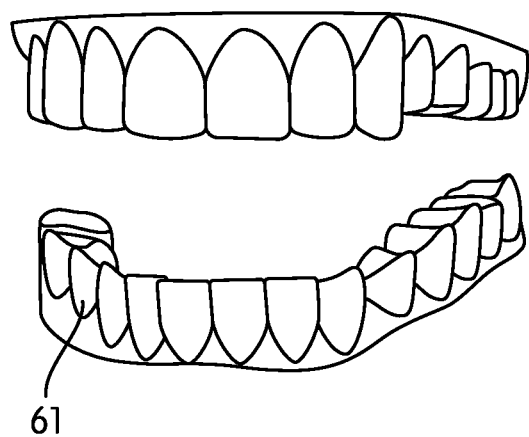
FIG. 7a is a front view of a three-dimensional tooth data record.
Figure 7B:
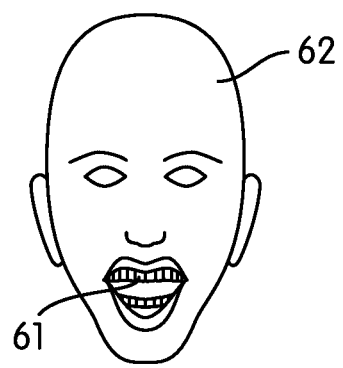
FIG. 7b is a front view of a three-dimensional data record of a patient's face having a proposed orthodontic/cosmetic treatment.

FIG. 5 shows a process 200 for proposing an orthodontic treatment. FIGS. 6a-7b show a three-dimensional facial data record 62 and a corresponding three-dimensional tooth data record 61 for correction of misaligned teeth. The process of proposing an orthodontic treatment 42 may start at Step S100 in FIG. 5 when a mobile device 54 or camera system 3 is engaged to capture a 3D facial data record 62 (FIG. 6a). As discussed earlier, a stereo video of the patient's face may alternatively be captured and object recognition methods may be used to detect anatomical features in the stereo video. By means of a facial recognition method, characteristic points 63 (FIG. 6b) of the face, such as points at the corners of the mouth may be determined in Step S200. On the basis of the characteristic points 63, the mouth or lips of the patient 14 may be recognized in Step S300. The facial recognition methods may also include methods as described in U.S. Pat. No. 8,831,295B2, entitled "Electronic device configured to apply facial recognition based upon reflected infrared illumination and related methods" by Coons, U.S. Pat. No. 7,804,997B2 entitled "Method and system for a three dimensional facial recognition system", by Geng et al, and U.S. Pat. No. 8,457,367B1, entitled "Facial recognition" by Sipe et al, and are incorporated by reference herein in their entirety, as if set forth fully herein.

A three-dimensional direction 65 of the orientation of the patient's face in the three-dimensional facial data record 62 may be determined in Step S400. A mouth area 64 between the lips of the patient 14 may be segmented and/or cut from the 3D facial data record 62 in Step S500. The three-dimensional representation of the actual teeth 66 of the patient 14 may also be extracted in Step S600 from the 3D facial data record 62. From the three-dimensional representation, it may also be determined if there is a misalignment (Step S700), through for example, automated measurements. The establishment of reference objects, reference frames and/or detection of anatomical dental features in the three-dimensional representation of the actual teeth 66 may allow for automatic dental measurements. The establishment of reference frames may allow for determination of how much the teeth are supposed to move or have moved. The detection of anatomical features may comprise automatic detection of landmarks associated with the 3D representation of the patient's actual teeth 66, the landmarks comprising at least one of cusps, ridges, grooves and contact points. Dental measurements may then be computed based on the reference objects, reference frames and/or anatomical dental features and compared with reference data (for example using artificial intelligence) in order to determine the presence of misalignments. Systems and methods for dental measurements may include those taught in U.S. Pat. No. 8,126,726B2, entitled "System and method for facilitating automated dental measurements and diagnostics", by Matov et al, which is incorporated by reference herein in its entirety, as if set forth fully herein.

In an alternative embodiment, the 3D representation of the patient's actual teeth 66 may be received from a previously created database or intraoral scan.

In Step S800 a proposed correction for the misaligned teeth may be obtained.

Moreover, instructions such as (i) predetermined instructions for correcting misalignments and/or (ii) instructions based on artificial intelligence may be to propose an orthodontic treatment. More specifically, in Step S800, artificial intelligence data analysis may be used on the obtained dental measurements of Step S700 to diagnose an orthodontic condition and generate a set instructions for the processor 122 to propose a correction. The processor 122 may be configured to identify a location and position of a plurality of teeth of the 3D representation of the patient's actual teeth 66 and assign corresponding coordinates. The diagnosis may be based on or a best fit to one or more inputs, that may be compared with the 3D representation of the patient's actual teeth 66 such as inputs being derived from or otherwise based on ongoing patient treatments, past patient treatments (such as diagnostic data sets of a past treatment with each diagnostic data set comprising coordinates that correspond to known locations/positions of a plurality of teeth), scientific literature, textbooks etc.

The processor 122 may further be configured to identify at least one treatment approach, a corrective appliance, corrected teeth, a combination thereof or otherwise orthodontic treatment 42 for at least one diagnosis, which may include calculating a set of target coordinates, which may represent a desired or corrected location or position of a tooth, and identifying at least one treatment approach, a corrective appliance, or a combination thereof, which may be at least partially effective in reorienting one or more teeth toward a location or position represented by one or more target coordinates. The method may also include determining a probability value that may be correlated with a relative likelihood of the orthodontic treatment 42 to be effective in reorienting one or more teeth to a location or position represented by a target, and may include employing an application of at least one artificial intelligence or other algorithm. Systems for employing artificial intelligence in treatment planning, such as are described in U.S. Pat. No. 9,788,917B2, entitled "Methods and systems for employing artificial intelligence in automated orthodontic diagnosis and treatment planning" by James Mah are hereby incorporated by reference in their entirety, as if set forth fully herein. In an exemplary embodiment of the present invention, the orthodontic treatment 42 may preferably be a three-dimensional tooth data record 61 (FIG. 7a) corresponding to the corrected teeth which may be stored for use in further treatment procedures such as for designing aligners.

In Step S900-S1100, the orthodontic treatment 42 may be rotated and overlaid (fully or partially or used to replace the 3D representation of the patient's actual teeth 66 on the mobile device 54) on the 3D facial data record 62 in such a way that the orientation of the orthodontic treatment 42 matches the 3D direction 65 of the orientation of the patient's face and the position matches the position of the mouth area 64. Herein a relative orientation of the orthodontic treatment 42 to 3D direction 65 of the orientation of the patient's face may be established. The relationship may be established, for example, on the basis of existing teeth that will remain or teeth that are to be replaced. The relevant relationship data may be stored so that the orientation of the orthodontic treatment 42 may take place automatically when the patient moves. Preferably, the 3D facial data record 62 may be colored due to the use of a color camera 62 in the smartphone and may also be updated in real time.

In another alternative embodiment, the tracking system 2 may be used to continuously orient the orthodontic treatment as discussed hereinafter.

In the case of an augmented overlay viewed by a clinician 10 through the display device 12 the orthodontic treatment 42 may be routed to a screen of the display device 12 such that the orthodontic treatment 42 appears directly superimposed on a treatment site 14a of the patient 14 in an augmented manner. Using data from the tracking system 2 including, for example, (i) real time data tracking changes in the patient's facial expressions 44 (e.g. smiling) (ii) real time data tracking clinician movements 46, and/or (iii) real time data tracking patient movements 50 (e.g. changes in position), the augmented data (orthodontic treatment 42) routed to the display device 12 may be dynamically updated in real time for overlay on the treatment site 14a such that said orthodontic treatment 42 appears directly superimposed on said site. Said treatment site 14a may be recognized using, for example, object recognition on data obtained from the camera system 3.

In view of the foregoing description, it may be appreciated that the example embodiments described herein provide a method, system and computer readable storage media for proposing and visualizing an orthodontic treatment.

Unless otherwise defined, all technical and scientific terms used herein have the same meaning as commonly understood by one of ordinary skill in the art to which this invention belongs. Although methods and materials similar to or equivalent to those described herein may be used in the practice or testing of the disclosure, suitable methods and materials are described above. All publications, patent applications, patents, and other references mentioned herein are incorporated by reference in their entirety to the extent allowed by applicable law and regulations. The disclosure may be embodied in other specific forms without departing from the spirit or essential attributes thereof, and it may therefore be desired that the present embodiment be considered in all respects as illustrative and not restrictive. Any headings utilized within the description are for convenience only and have no legal or limiting effect.

The invention claimed is:

1. A method of operating a system for proposal and augmented visualization of an orthodontic treatment, the system comprising: a display device for augmented visualization, wherein the display device comprises an augmented reality glass or HUD display; a mobile device which is configured for distance measurement; and at least one processor, the method comprising:
recording a three-dimensional image of a face with the mobile device to obtain a three-dimensional facial data record;
segmenting a mouth area of the three-dimensional facial data record;
obtaining a three-dimensional representation of actual teeth to be corrected;
establishing reference objects or reference frames in the three-dimensional representation of actual teeth to be corrected;
determining misalignments of the three-dimensional representation of actual teeth to be corrected by comparing the reference objects or reference frames with reference data;
determining an orthodontic treatment as a three-dimensional tooth data record based on the determined misalignments of the three-dimensional representation of actual teeth; and
overlaying the orthodontic treatment as an augmentation on the mouth area through the display device for augmented visualization such that the orthodontic treatment appears directly superimposed on the mouth area.

2. The method according to claim 1, wherein the mobile device is further configured for motion tracking and/or for color measurement.

3. The method according to claim 1, further comprising:
determining characteristic points within the three-dimensional facial data record;
determining a direction of orientation of the face in the three-dimensional facial data record based on the characteristic points; and
orienting said orthodontic treatment such that its direction matches the direction of orientation of the face in the three-dimensional facial data record.

4. The method according to claim 1, further comprising designing a corrective appliance based on the orthodontic treatment.

5. The method according to claim 1, wherein the three-dimensional representation of actual teeth is obtained through extraction from the three-dimensional image of the face or obtained from a scan.

6. The method according to claim 1, further comprising:
detecting anatomical dental features in the three-dimensional representation of actual teeth to be corrected; and
determining misalignments of the three-dimensional representation of actual teeth to be corrected by comparing the anatomical dental features with reference data.

7. The method according to claim 6, wherein the anatomical dental features include at least one of cusps, ridges, grooves and contact points.

8. The method according to claim 1, further comprising continuously updating the three-dimensional facial data record based on data from the mobile device, including real time data tracking changes in facial expressions and/or patient movements.

9. The method according to claim 1, wherein the orthodontic treatment is determined in real-time.

10. A non-transitory computer-readable storage medium storing a program which, when executed by a computer implemented system causes the system to perform the method steps according to claim 1 wherein the system includes:
a display device for augmented visualization, wherein the display device includes an augmented reality glass or HUD display;
a mobile device which is configured for distance measurement, and
at least one processor configured to perform the program that causes the at least one processor to:
record a three-dimensional image of a face with the mobile device to obtain a three-dimensional facial data record;
segment a mouth area of the three-dimensional facial data record;
obtain a three-dimensional representation of actual teeth to be corrected;

establish reference objects or reference frames in the three-dimensional representation of actual teeth to be corrected;

determine misalignments of the three-dimensional representation of actual teeth to be corrected by comparing the reference objects or reference frames with reference data;

determine an orthodontic treatment as a three-dimensional tooth data record based on the determined misalignments of the three-dimensional representation of actual teeth; and overlay the orthodontic treatment as an augmentation on the mouth area through the display device for augmented visualization such that the orthodontic treatment appears directly superimposed on the mouth area.

11. The method according to claim 1, wherein the reference data includes data obtained from ongoing patient treatments, past patient treatments, scientific literature and textbooks.

12. A system for visualizing an orthodontic treatment, the system comprising:

a display device for augmented visualization, wherein the display device comprises an augmented reality glass or HUD display;

a mobile device which is configured for distance measurement, and at least one processor configured to perform the method comprising:

recording a three-dimensional image of a face with the mobile device to obtain a three-dimensional facial data record;

segmenting a mouth area of the three-dimensional facial data record;

obtaining a three-dimensional representation of actual teeth to be corrected;

establishing reference objects or reference frames in the three-dimensional representation of actual teeth to be corrected;

determining misalignments of the three-dimensional representation of actual teeth to be corrected by comparing the reference objects or reference frames with reference data;

determining an orthodontic treatment as a three-dimensional tooth data record based on the determined misalignments of the three-dimensional representation of actual teeth; and overlaying the orthodontic treatment as an augmentation on the mouth area through the display device for augmented visualization such that the orthodontic treatment appears directly superimposed on the mouth area.

13. The system according to claim 12, wherein the mobile device is further configured for motion tracking and/or for color measurement.

* * * * *